William A. Schulze,
INVENTOR.

BY

United States Patent Office 3,283,508
Patented Nov. 8, 1966

3,283,508
MISSILE CONTROL SYSTEM
William A. Schulze, Huntsville, Ala., assignor to the United States of America as represented by the Secretary of the Army
Filed Oct. 6, 1965, Ser. No. 505,088
1 Claim. (Cl. 60—223)

The invention described herein may be manufactured and used by or for the Government for governmental purposes without the payment of any royalty thereon.

This application is a continuation-in-part of application Serial Number 251,448 filed January 14, 1963.

This invention relates to a missile control system and more particularly to apparatus for initiating thrust termination of a rocket motor or motors responsive to a predetermined pressure drop in the combustion chambers of the rocket.

In the past, overspeed devices attached to the drive shaft of propellant pumps or turbines were used to shut down missile or rocket engines, however, since the pump or turbine r.p.m. does not necessarily represent the pressure in the combustion chamber or injector, an accurate determination of the preformance level of the engine could not be accomplished by the overspeed devices and thrust termination could occur even with the engine operating within the design parameters.

My invention comprises a control system for missiles or rockets and includes apparatus for automatically initiating and sustaining a missile's flight and for automatically discontinuing flight of the missile by terminating thrust thereof at a predetermined time. The thrust termination is accomplished by a device disposed for generation of an electric signal responsive to pressure in the combustion chamber below a predetermined critical value. The electric signal actuates the control apparatus in predetermined and orderly sequence for thrust termination.

It is therefore an object of my invention to provide a control system for missiles or rockets. It is a further object of my invention to provide a control system with a device for generation of an electric signal responsive to a pressure decrease in the combustion chamber below a critical value.

Other objects and advantages of the invention will be more readily apparent from the following detailed description taken in conjunction with the following drawings in which.

Figure 1:
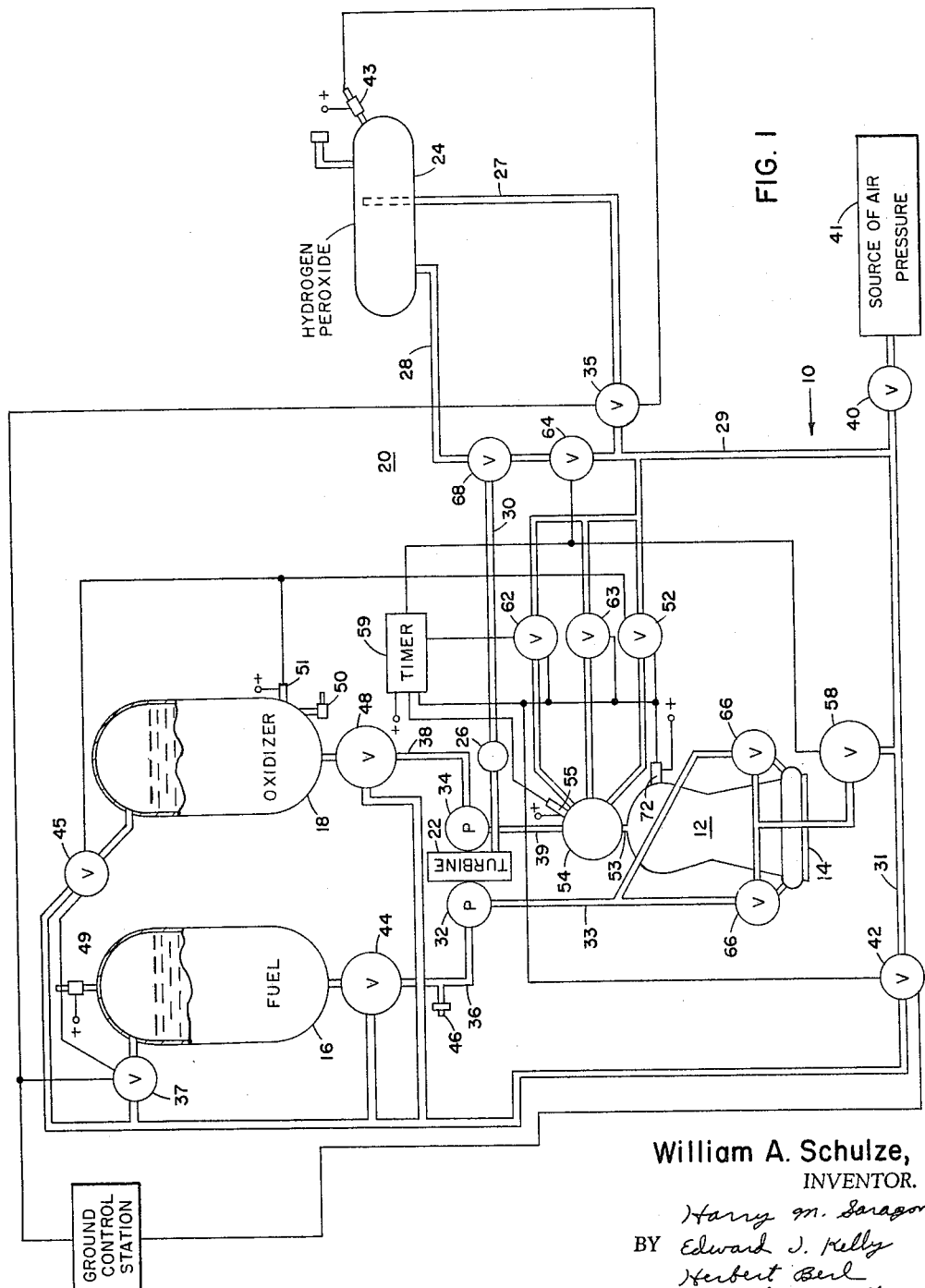
FIGURE 1 is a schematic view of the missile control system.

As shown in FIGURE 1, a missile 10 including a combustion chamber 12 is provided with a nozzle 14 through which the combustion gases are rearwardly discharged to propel the missile. Storage tanks 16 and 18 are respectively provided for the fuel and oxidizer. Hereinafter, the fuel and oxidizer will respectively be referred to as alcohol and liquid oxygen; however, any similar combustible liquids may be used if desired.

A gas generator, generally designated by the numeral 20, is disposed for actuation to generate gas to operate a steam turbine 22 to force the liquid oxygen and alcohol to combustion chamber 12. As shown schematically in FIGURE 1 the generator 20 includes a pressurized hydrogen peroxide tank 24 connected to a decomposition chamber 26 by a pair of conduits 28 and 30, respectively. The hydrogen peroxide is forced into the decomposition chamber by pressure in tank 24 for operation of steam turbine 22. A pair of conduits 27 and 29 connects tank 24 to a source of gas, such as pressurized air 41 for pressurization of the hydrogen peroxide tank. A separate source of air is carried on board the missile for use during flight.

A pair of pumps 32 and 34 respectively are disposed on opposite sides of the turbine for operation thereby. Pump 32 communicates with alcohol tank 16 by means of a suction pipe 36. An alcohol feeding line 33 connects pump 32 to combustion chamber 12. Pump 34 is connected by means of a suction pipe 38 to oxygen tank 18 and by means of an oxygen feeding line 39 to combustion chamber 12. The fuel and oxidizer are forced through suction pipes 36 and 38, respectively by tank pressure and force of gravity and pumps 32 and 34 respectively force the alcohol and oxygen to the combustion chamber through lines 33 and 39 respectively for ignition and takeoff of the missile.

Prior to takeoff, the missile undergoes a fueling stage, a pressurization stage, and ignition and main stage operation for launching of the missile.

To fuel the missile a hand operated valve 40 is opened to permit air pressure from the source of pressurized air to flow to a control valve 42 mounted in a conduit 31 which connects to pressurized air source 41. Valve 42 is then energized from the ground control station to open position and pressurized air flows through valve 42 to actuate to open position, a pressure actuated preliminary alcohol valve 44, mounted in suction pipe 36, and alcohol is pumped from ground containers into alcohol container 16 through a missile coupling 46 which connects the ground fuel equipment to the missile. Air pressure flowing through conduit 31 and valve 42 also opens a preliminary oxygen valve 48, secured in line 38, and after alcohol container 16 has been filled, the oxygen container 18 is filled with liquid oxygen from the oxygen filling equipment, through a missile coupling 50.

Hydrogen peroxide is then forced to flow into tank 24 and the tank is measured to determine when the required amount of hydrogen peroxide is in the tank. Such determination may be made through the use of calibrated supply tanks or flow meters or any of many conventional means known in the art.

When fueling is completed, pressurization, preliminary, ignition and main stage operations are accomplished in the following manner.

A pressurizing valve 35 mounted in conduit 27 and a valve 37 mounted in the conduit connecting the alcohol tank to the air source is energized to open position by operating a switch (not shown) in the ground control station and the hydrogen peroxide tank and alcohol container are simultaneously pressurized. A pressure switch 43 mounted on tank 24 interrupts pressurization of tank 24 by closing off valve 35 at a predetermined pressure. When pressure in the alcohol container reaches a predetermined level, a pressure responsive switch 49 carried in alcohol tank 16 is actuated to close off valve 37 and open a valve 45 mounted adjacent tank 18 in the conduit connecting tank 18 to the source of air to initiate pressurization of the oxygen tank to a predetermined level at which point a pressure responsive switch 51, carried by the oxygen tank, is actuated by pressure in the tank to provide a signal to close off valve 45 and for energization of a control valve 52 which is mounted between the air pressure source and a main oxygen valve 54 mounted in a manifold 53 disposed in line 39 intermediate pump 34 and combustion chamber 12. Control valve 52 is opened at energization to allow pressurized air to flow therethrough to actuate main oxygen valve 54 to preliminary stage position. Valve 54 is provided with a preliminary position switch 55 which is energized when valve 54 is actuated to its preliminary position.

Switch 55 then actuates timing mechanism of a timer 59, and, approximately five seconds after energization, the timer actuates to an open position the main alcohol control valve 58, oxygen control valve 62, and hydrogen peroxide control valve 64 to allow pressurized air to flow therethrough and open, respectively, the main alcohol valves 66, main oxygen valve 54 and hydrogen peroxide shut-off valve 68 to their main stage positions. Hydrogen peroxide is then forced into the decomposition chamber 26 to start the turbine operating. The turbine operates the pump to force the fuel and oxidizer to the combustion chamber for ignition and firing of the missile.

Should the missile not perform within specified limits during flight or prior to takeoff, there is provided a pressure switch 72 disposed in communication with the combustion chamber to initiate thrust termination. Pressure switch 72 responds to pressure variations in the combustion chamber to provide an output signal through the timing mechanism of timer 59 to actuate valves 64 and 58 to closed position. With valve 64 closed, pressurized air is prevented from flowing to valve 68 thus closing valve 68 and preventing flow of hydrogen peroxide to decomposition chamber 26, thus stopping operation of turbine 22. By closing valve 58, air pressure is prevented from flowing to valves 66 thus shutting off valves 66.

Switch 72 also actuates valves 52 and 62 to venting position while simultaneously energizing valve 63. Valve 63 due to venting of valves 52 and 62 overrides actuation of valves 52 and 62 and closes valve 54. Control valve 42 is also simultaneously actuated to closed position by pressure switch 72 to prevent further pressurized air from flowing to preliminary alcohol valve 44 and preliminary oxygen valve 48, thus closing valves 44 and 48 and preventing fuel and oxidizer, respectively from flowing to the pumps.

Figure 2:
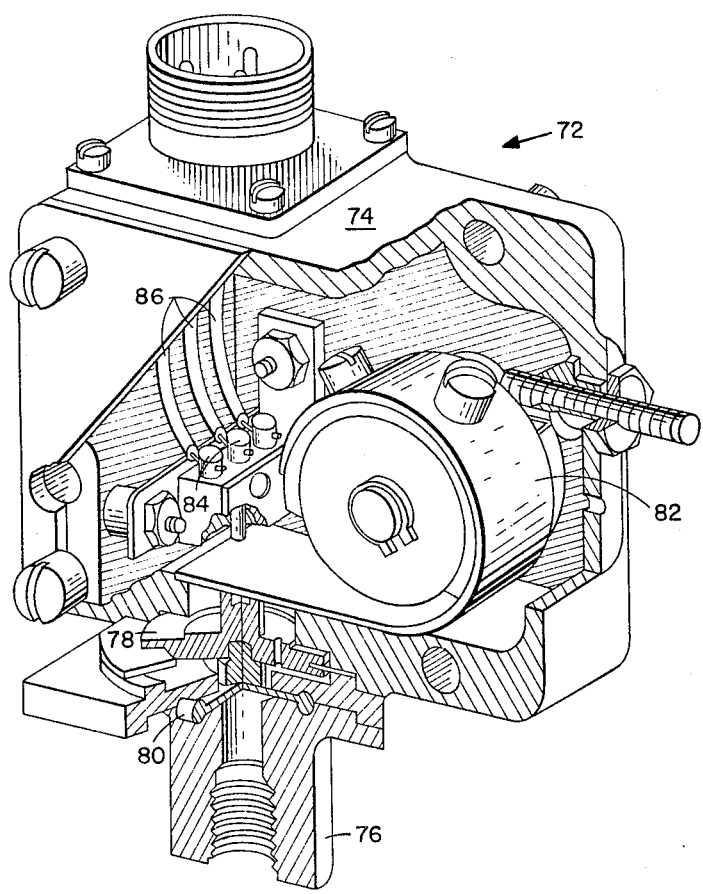
FIGURE 2 is a cutaway pictorial view of the pressure switch used to initiate thrust termination.

As shown in FIGURE 2, pressure switch 72 includes a housing 74 having an inlet 76 for admission of combustion gases therein. A pair of diaphragms 78 and 80 are mounted in the switch and disposed for movement responsive to a pressure drop in the combustion chamber below a predetermined value. A spring member 82 carried in the evacuated interior of housing 74 is disposed for contact with a plurality of electrical contacts 84 for generation of an electrical signal. The signal is disposed for transmission through contacts 86 to the above-identified valves for operation of the system as described It is to be understood that the signal generated by switch 72 may be utilized in other manners than described. For example, the signal could be used to trigger release mechanisms of a vehicle, to give signals to the guidance computer, to trigger separation devices, to vent containers. The signal could also be used for clustered engines cutoff of all engines if one of several engines do not perform within requirements. Also, to shut engines down if propellants deplete to prevent explosion of the propulsion system. Furthermore, by utilizing the signal during static firings, the test stand can be protected effectively if malfunction occurs during the run.

It is to be understood that the description of my invention is to be taken in the illustrative sense and not in the limiting sense and that various modifications may be resorted to. For example, the pressure switch could be mounted in the propellant feed lines to be responsive to pressure variations therein. However, such modifications are within the spirit and scope of the appended claims.

I claim:

A control system for a rocket having a propulsion unit including a pair of tanks respectively disposed for containing fuel and oxidizing liquids therein and a combustion chamber for ignition of said liquids to provide thrust for the rocket, said control system comprising:
(a) a conduit disposed in communication with said fuel tank and said combustion chamber;
(b) a second conduit disposed in communication with said oxidizer tank and said combustion chamber;
(c) valve means disposed in each of said conduits in proximity of said fuel and oxidizer tanks to control the flow of said liquids therefrom;
(d) a turbine secured to said conduits intermediate said tanks and said combustion chamber;
(e) a pair of pumps respectively mounted in each of said fuel and oxidizer conduits and disposed adjacent said turbine to carry said liquids to said combustion chamber;
(f) a tank containing hydrogen peroxide, said tank disposed in communication with said turbine for operation thereof responsive to decomposition of said hydrogen peroxide;
(g) valve means mounted in said second conduit intermediate said pumps and said combustion chamber to control flow of said liquid oxygen from said pump to said combustion chamber;
(h) means secured in said combustion chamber for generation of an electric signal responsive to a pressure lower than a predetermined valve in said combustion chamber, means responsive to said signal for actuation of respective ones of said valve means in predetermined sequential order for shut down of said propulsion unit.

No references cited.

MARK NEWMAN, *Primary Examiner.*

D. HART, *Assistant Examiner.*